Patented July 28, 1931

1,816,533

UNITED STATES PATENT OFFICE

WILBERT J. HUFF AND CHARLES GORDON MILBOURNE, OF BALTIMORE, MARYLAND; SAID MILBOURNE ASSIGNOR TO SAID HUFF

PROCESS OF PURIFYING GASES

No Drawing. Application filed July 17, 1929. Serial No. 379,062.

This invention relates to the process of removing hydrogen sulfide from gases by means of hydrated iron oxide, and has for its object to render the process more certain, more expeditious, and cheaper.

In extracting hydrogen sulfide from gases by means of iron oxide it is necessary to cause the hydrogen sulfide to react with iron oxide to form iron sulfide. This is indicated by means of the following chemical equation: (From Morgan, Manufactured Gas, Vol. I, page 430)

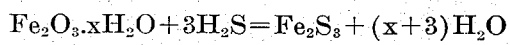

$$Fe_2O_3 \cdot xH_2O + 3H_2S = Fe_2S_3 + (x+3)H_2O$$

In order to render the process economic it is necessary to revivify the iron oxide. This reaction is indicated by the following equation:

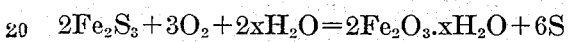

$$2Fe_2S_3 + 3O_2 + 2xH_2O = 2Fe_2O_3 \cdot xH_2O + 6S$$

The revivification has been accomplished by removing the oxide from the purifying box and spreading it out in the air, or air has been admitted to the gases undergoing purification in order to permit continuous fouling and revivification. The second process is generally known as revivification in situ.

While the above indicated processes appear very simple and have been carried out in technical practice for a great many years, the operation is accompanied by some uncertainties and difficulties. Thus at times it is found that a box of iron oxide which has never been used before fails to remove completely all the hydrogen sulfide when first placed in operation. After a time, however, for no cause readily apparent to the operator, this condition changes, the efficiency of the oxide improves, and the removal of hydrogen sulfide becomes complete. At other times a box which has been in use only a short time loses its efficiency and no longer gives a satisfactory removal of hydrogen sulfide. This last has often led to the premature removal of the iron oxide from the box, thus entailing increased expense.

We have found that these faulty operations are associated with improper moisture conditions in the oxide, and that the rôle of water vapor in these reactions is very important. To correct these faulty conditions we have invented the process of operation under controlled humidities and desire to protect the same by Letters Patent.

The importance of our development is shown by tests of the rate of revivification. Thus certain fouled iron oxide may be exposed to air at 20% humidity for months without revivification. The same fouled oxide exposed to air at higher humidities, however, revivifies with increasing rapidity, and at 95% humidity the complete revivification occurs within five minutes. If revivification in situ is practiced, however, the humidity must not be so high that precipitation of liquid moisture occurs, because the very wet oxide is not so active in the removal of hydrogen sulfide. For this removal we prefer to use humidities of about 50 to 60 per cent. Thus we have found that an oxide maintained and operated at 50 to 60 per cent humidity is very much more efficient in the removal of hydrogen sulfide than is the same oxide maintained and operated at a humidity of 90%.

In the technical operation of the process the oxide, usually mixed with a fluffing material, such as wood shavings, is placed in a series of boxes through which the gas passes in turn. According to our process the humidities maintained on each of these boxes will depend upon whether it is desired to revivify in situ or not. If revivification in situ is not practiced, the humidity throughout the boxes is maintained at from 45 to 60 per cent approximately. This is most conveniently done by reducing the temperature of the gas leaving the condensers to a point sufficiently low to insure condensation of the excess water vapor. Thus if the oxide boxes are to operate at a temperature of 80° F., the gas leaving the condenser may be cooled to approximately 60° F. and then is reheated to the operating temperature or the oxide is maintained at the desired temperature by circulating warmer water through coils embedded in the boxes. Since the gas leaving the first box has increased both in temperature and in water vapor content as a result of the chemical reactions, the temperature of the succeeding boxes is adjusted to maintain the requisite 50 to 60 per cent humidity. This can easily be done with the aid of vapor pressure tables, and a knowledge of the amount of hydrogen sulfide removed by the first box.

When an oxide box is fouled according to the procedure outlined it is cut off the gas line and revivified either by passing through the box air or other oxygen containing gas mixtures humidified to approximately 90-100 per cent, or it may be removed from the box, spread out and exposed to a humid oxygen-containing gas.

When revivification in situ is practiced, we may strike a balance between the humidity required for the best fouling operation and that required for the best revivification. Under these conditions we operate at an intermediate humidity of some 70 to 85 per cent. When the system contains four or more boxes, however, we prefer to operate each of the boxes of the series so as to favor the reaction which we wish to have predominate in that box. Thus we may prefer to have the first box function chiefly as a remover of hydrogen sulfide in which case we adjust the temperature and water vapor content to give a humidity of from 45 to 60 per cent in this box. The second and third boxes may be chiefly undergoing revivification, in which case we may adjust the temperature and water vapor conditions to give approximately 90 to 95 per cent, while the last box, used for the removal of the last traces of hydrogen sulfide may be adjusted for a humidity of from 45 to 60 per cent.

Having thus fully described our invention we claim:

1. The process of removing hydrogen sulfide from gases by reaction with solid material containing iron oxide which consists in passing the gases over said solid material while the humidity of the gases is controlled at constant fixed points between 45 and 95 per cent.

2. The process of removing hydrogen sulfide from gases which consists in passing the gases over solid material containing iron oxide while the humidity of the gases is maintained at from 45 to 70 per cent whereby sulfur is retained by the solid material and water vapor is eliminated.

3. The step in the process of removing hydrogen sulfide from gases by reaction with solid material containing iron oxide which consists in revivifying the sulfied iron oxide material by passing over said material an oxygen containing gas bearing sufficient water vapor to give constant fixed high humidities below 95 per cent.

4. The process of removing hydrogen sulfide from gases by reaction with iron oxide and simultaneously revivifying fouled iron oxide which consists in admixing oxygen with the gases to be purified and controlling the humidity of the mixture at an intermediate value between 70 and 95 per cent while passing the mixture over the iron oxide, whereby sulfur is retained and water is eliminated by the fresh iron oxide, and sulfur is set free and water is absorbed by the fouled iron oxide.

WILBERT J. HUFF.
C. GORDON MILBOURNE.